United States Patent
Reddy (10) Patent No.: US 6,301,927 B1
(45) Date of Patent: Oct. 16, 2001

(54) AUTOREFRIGERATION SEPARATION OF CARBON DIOXIDE

(76) Inventor: Satish Reddy, Engineering Bldg., One Fluor Dr., Aliso Viejo, CA (US) 92656-2606

(*) Notice: Subject to any disclaimer, the term of this patent is extended or adjusted under 35 U.S.C. 154(b) by 0 days.

(21) Appl. No.: 09/554,806
(22) PCT Filed: Jan. 4, 1999
(86) PCT No.: PCT/US99/00087
 § 371 Date: Jul. 11, 2000
 § 102(e) Date: Jul. 11, 2000
(87) PCT Pub. No.: WO99/35455
 PCT Pub. Date: Jul. 15, 1999
(51) Int. Cl.$^7$ .................................................. F25J 3/00
(52) U.S. Cl. ........................................ 62/619; 62/929
(58) Field of Search ............................ 62/617, 606, 619, 62/637, 928, 929

(56) References Cited

U.S. PATENT DOCUMENTS

| | | | |
|---|---|---|---|
| 2,617,484 | * 11/1952 | Swearingen | 62/928 |
| 2,632,216 | * 3/1953 | Eastman | 62/928 |
| 2,996,891 | * 8/1961 | Tung | 62/637 |
| 3,132,016 | * 5/1964 | Kurata | 62/637 |
| 3,324,668 | * 6/1967 | Lohrenz | 62/929 |
| 3,398,544 | * 8/1968 | Crownover | 62/929 |
| 3,417,572 | * 12/1968 | Pryor | 62/928 |
| 3,420,633 | * 1/1969 | Lee | 62/928 |
| 4,822,394 | * 4/1989 | Zeigler et al. | 62/928 |
| 4,952,223 | * 8/1990 | Kirshnamurthy et al. | 62/606 |
| 5,233,837 | * 8/1993 | Callahan | 62/928 |
| 5,956,971 | 9/1999 | Cole et al. | 62/623 |
| 6,155,076 | * 12/2000 | Cullen | 62/606 |

* cited by examiner

Primary Examiner—Ronald Capossela
(74) Attorney, Agent, or Firm—Fish & Associates, LLP (57) ABSTRACT

Carbon Dioxide is separated from other gases using autorefrigeration. In general, a feed gas containing Carbon Dioxide is compressed (100), and then expanded (250) to produce work. Carbon Dioxide in the feed gas is liquefied, and the liquefied Carbon Dioxide is then separated (282) from other components that remain gaseous. While all commercially viable embodiments are contemplated, embodiments are preferred in which the claimed methods and apparatus provide significant commercial advantages over the prior art. For example, it is preferred that feed gases are employed in which the Carbon Dioxide concentration is at least 40%, more preferably at least 60%, and still more preferably at least 80%. All percentages herein are given in mole percent. It is also preferred that feed gases be compressed to at least 15 bar absolute in all applications, at least 30 bar absolute in some embodiments, and at least 60 bar absolute in other embodiments.

20 Claims, 9 Drawing Sheets

AUTOREFRIGERATION SEPARATION OF CARBON DIOXIDE

FIELD OF INVENTION

The present invention relates to methods for separating Carbon Dioxide from gases containing Carbon Dioxide.

BACKGROUND

Many facilities, including petroleum refineries, fertilizer plants, and fermentation plants, produce gases containing Carbon Dioxide ($CO_2$). Often the Carbon Dioxide is considered a waste gas, and is merely vented to the atmosphere. In other instances the Carbon Dioxide can be separated out from the remaining gases, and utilized in some manner.

There are numerous known methods for separating Carbon Dioxide from other gases, including absorption by physical and chemical solvents, membranes and molecular sieves, and so forth. Such processes are, however, not particularly cost effective, if the Carbon Dioxide is required to be recovered as a liquefied product. Typically, Carbon Dioxide liquefaction utilized as part of a Carbon Dioxide separation process is performed using an added, (i.e., non-Carbon Dioxide) refrigerant. In prior art FIG. 1, for example, feed gas provided by a feed gas stream 100 is compressed in compressor 102, and is cooled against cooling water in water stream 106A. The compressed gas is then passed to a gas cooling unit 104, where it is cooled against cooling water in stream 106B and refrigerant in stream 108A. The cooled gas is then dried in gas drier 112, which typically uses molecular sieve or alumina desiccants. Gas drier 112 uses heat in stream 110. The desiccant bed is typically heat regenerated after it is fully loaded with moisture. Carbon Dioxide in the dried gas is then liquefied in liquefaction unit 114 against refrigerant in stream 108B, while other gases remain gaseous. Finally, since undesirable concentrations of impurities may be dissolved in the liquefied Carbon Dioxide, the impurities are removed using a stripping column 116. The output of the process is a purge stream containing impurities 118, and a purified Carbon Dioxide stream 120.

Figure 1:
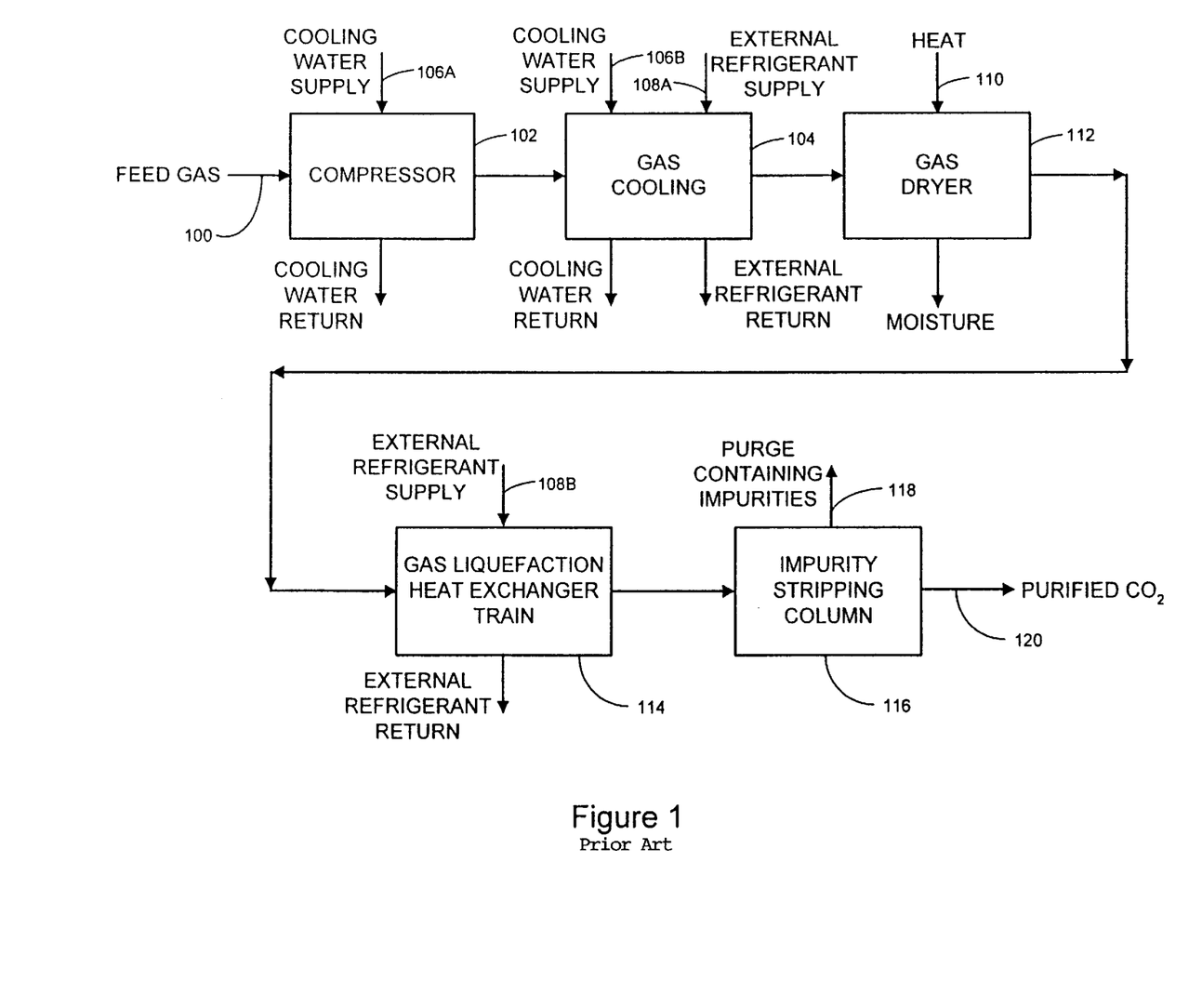
FIG. 1 is a flow diagram of a generalized prior art Carbon Dioxide separation using an added refrigerant.

Liquefaction using an added refrigerant as depicted in FIG. 1 is problematic. For example, refrigerants having high operational efficiency, including ammonia and chlorofluorocarbons (CFCs), are often considered environmentally hazardous, and their use in many geographic areas may be severely restricted or even prohibited. Added refrigerants may also be expensive to purchase and maintain through the life span of the separation process. Still further, refrigerants introduce complexity, which results in increased capital and operational expenses, especially where regulatory changes require the use of a substitute refrigerant.

Thus, there remains a need for methods and apparatus that provides Carbon Dioxide separation without necessarily relying on refrigerants.

SUMMARY OF THE INVENTION

The present invention is directed to methods and apparatus in which Carbon Dioxide is separated from other gases using autorefrigeration. In, general, a feed gas containing Carbon Dioxide is compressed, and then expanded to produce work. Carbon Dioxide in the feed gas is thereby liquefied, and the liquefied Carbon Dioxide is then separated from other components that remain gaseous.

While all commercially viable embodiments are contemplated, embodiments are preferred in which the claimed methods and apparatus provide significant commercial advantages over the prior art. For example, it is preferred that feed gases are employed in which the Carbon Dioxide concentration is at least 30%, more preferably at least 50%, still more preferably at least 80%, and still more preferably at least 90%. All gas percentages herein are given in mole percent. It is also preferred that feed gases be compressed to at least 15 bar absolute in all applications, at least 30 bar absolute in some embodiments, and at least 60 bar absolute in other embodiments. It is still further preferred that the Carbon Dioxide separated out from the feed gas is purified to at least 98% purity, and more preferably at least 99% purity.

It is contemplated that the claimed methods and apparatus will have widespread applicability. Among other things, the Carbon Dioxide containing feed gases can arise from many different sources, including fertilizer plants, chemical plants, refineries, gasification plants, landfills and natural gas supplies. Depending on the source, preliminary purification may involve removal of (1) particulate matter, (2) sulfur compounds, and (3) organic compounds in general.

Various objects, features, aspects and advantages of the present invention will become more apparent from the following detailed description of preferred embodiments of the invention, along with the accompanying drawings in which like numerals represent like components.

DETAILED DESCRIPTION

Figure 2:
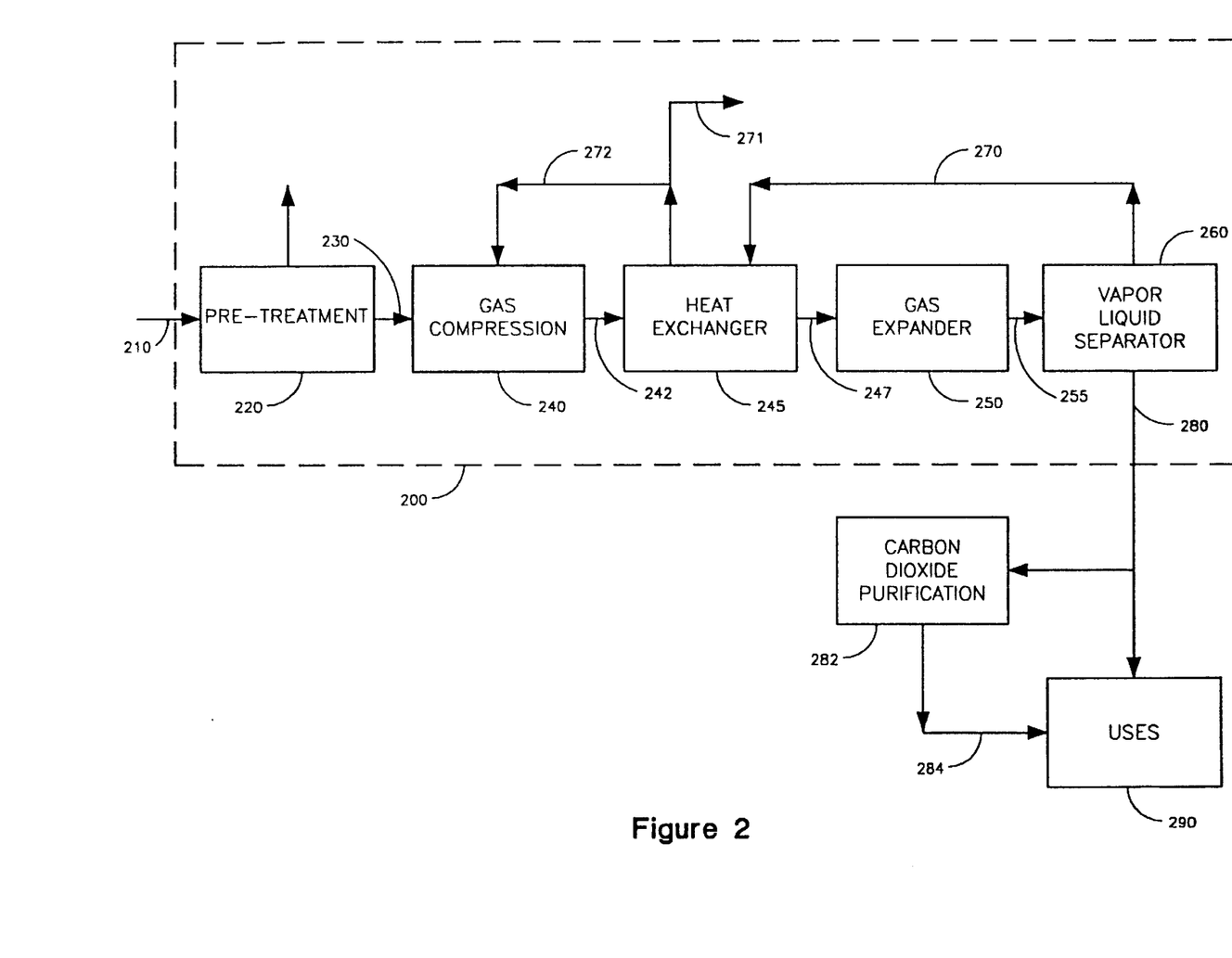
FIG. 2 is a flow diagram of a generalized Carbon Dioxide separation according to the present invention.

FIG. 2 depicts a flow diagram of a generalized autorefrigeration process 200 in which Carbon Dioxide is removed from a source gas. In general, a source gas stream 210 is optionally pre-treated to remove impurities in pre-treating unit(s) 220 to produce a feed gas 230. The feed gas 230, optionally together with the recirculating gas 272, is then compressed in compressor 240, and expanded in expander 250 to produce a mixed phase stream 255. The mixed phase stream 255 has a liquid Carbon Dioxide component and a vapor stream consisting of uncondensed Carbon Dioxide and other constituents of the feed gas 230. The mixed phase is separated by separator 260 into a vapor stream 270 and a liquid Carbon Dioxide stream 280. Some or all of the vapor stream 270 may optionally be recirculated to a heat exchanger 245. Where heat exchanger 245 is used, there may also be re-circulation in stream 272 to the compressor 240 and purged in stream 271. Some or all of the Carbon Dioxide stream 280 may be applied directly for various uses 290, or optionally preceded by further purification or other processing 282.

Source Gas 210

The source gas 210 is contemplated to comprise any gas that contains Carbon Dioxide as a significant component. Contemplated source gases include waste gases from hydrocarbon or chemical processes such as petroleum refineries, fertilizer plants, chemical and petrochemical plants and fermentation plants. The source gas may thus contain a mixture of gases including hydrogen, methane or higher hydrocarbons, nitrogen, carbon monoxide, water vapor and other constituents such as organic and sulfur compounds.

The source gas 210 may be provided at substantially any pressure and temperature combination. Typical pressures are 1 to 2 bar absolute, although it should be appreciated that some sources such as Ammonia plants (FIG. 5) and Methanol plants (FIG. 6) may provide a gas stream of at least 10 to 20 bar. Typical source gas temperatures range from 0°C. to 50° C.

Pre-treating Unit 220

Pre-treating unit(s) 220 is/are contemplated to process the source gas 210 prior to compression and liquefaction. Especially contemplated are pre-treating by removal of impurities that would otherwise be significantly detrimental to the system, and pretreating by adjusting temperature, pressure, or other variables.

Contemplated constituents that may be removed during pre-treating include, but are not limited to, sulfur derivatives, organic compounds, minerals, and particulate matter. Where the source gas 210 contains water vapor, a pre-treating unit 220 preferably dries the gas to a target moisture level that prevents ice formation as the Carbon Dioxide is liquefied. Such target moisture level depends on temperature and pressure considerations, and is well within the skill of those in the art. Where feed gas is to be dried, such drying preferably occurs downstream of the gas compressor 240. Where the source gas 210 contains particulate matter, a pre-treating unit 220 preferably filters the gas to remove enough of the particulates to prevent significant damage to the turbines and other components of the system. Where the source gas 210 contains sulfur, a pre-treating unit 220 preferably scrubs the gas to remove $SO_X$, $H_2S$, and so forth. Suitable dryers, filters, scrubbers, and other pre-treating units are well known in the art.

Feed Gas 230

The feed gas 230 comprises the purified gas exiting from the pre-treating unit(s) 220. The claimed methods and apparatus are cost effective at a wide range of Carbon Dioxide concentrations, conceivably as low as 20% Carbon Dioxide, but more preferably at least 30% Carbon Dioxide. Moreover, relative efficiencies of the claimed methods and apparatus over conventional systems are expected to improve with increasing Carbon Dioxide concentration, such that feed gas concentrations of at least 50% Carbon Dioxide, at least 80% Carbon Dioxide, and even at least 90% Carbon Dioxide are also contemplated.

With respect to other parameters, it is contemplated that the feed gas 230 will have an initial pressure of about 1–2 bar absolute, although greater or lesser pressures are also contemplated. For example, feed gas 230 at pressures greater than 10 bar absolute may arise from Ammonia plants (FIG. 5) and Methanol plants (FIG. 6). Feed gas 230 is also contemplated to have a temperature similar to ambient temperature, although higher or lower temperatures are also contemplated.

Compressor 240

Compression may take place at any stage or combination of stages with respect to pre-treating 220, and is likely to take place in stages. In some embodiments, for example, such as where the source gas 210 is derived from a relatively low pressure facility such as a fermentation plant, the source gas 210 may be compressed to about 1.2 to 20 bar absolute prior to pre-treating 220. Following pre-treating 220, additional compression may raise the feed gas 230 to at least 15 bar absolute, and preferably between about 25 and 50 bar absolute. Depending on the composition of the process gas 247 and the autorefrigeration process being used, the pressure of the feed gas 230 feeding the expander 250 may range from 30–60 bar absolute, 60–90 bar absolute, and even measure above 90 bar absolute.

Any suitable compressor 240 for compressing a gas may be used. Centrifugal compressors are preferred, although other types of compressors, including axial, reciprocating and screw compressors, are also contemplated. The compressor can be optionally divided into two sections. The first section is dedicated to the initial feed gas compression, while the second section is devoted to the compression of the mixture of the feed gas 230 and recirculating gas 272 to the pressure required at the inlet to the gas expander 250.

In compressed gas cooling, inter-cooling steps and/or after-cooling steps provided at one or more intervals before, during or after the compression stage are used to reduce the temperature of the feed gas 230. Preferably, in a multi-stage compression, a compressed gas cooling step may be provided after each compression step. For example, in a four-step compression stage (not shown), four compressed gas cooling steps are provided one after each compression step. These compressed gas cooling steps may employ any known coolant, for example water or air. Such coolants are capable of cooling the temperature of the feed gas 230 to ambient temperature, typically between 30 ° C. and 50° C. Typically, the temperature of the feed gas 230 may increase by between 30° C. and 150° C. after each compression step, and a subsequent compressed gas cooling step may then decrease the feed gas 230 temperature to typically between 30° C. and 45° C.

Heat Exchanger 245

One or more cooling or chilling steps are contemplated prior to, during, or immediately after the compression stage, particularly if the temperature of the feed gas 230 increases significantly during compression. For example, a heat exchanger 245 can be utilized as shown to cool the gas leaving the compressor 240. The heat exchanger 245 itself can be entirely conventional, and may receive a cooling stream from a conventional source such as a refrigerant from a refrigeration unit. Heat exchanger 245 may also, however, receive a tailgas recirculation stream 272 as described below.

In compressed gas chilling, the temperature of the compressed feed gas 242 is reduced below that achieved by compressed gas cooling, while still maintaining the temperature higher than that at which condensation of the Carbon Dioxide takes place. Compressed gas chilling is typically an advantageous method of increasing the energy efficiency of the process. Compressed gas chilling typically reduces the compressed feed gas 242 temperature to below 30° C., preferably below 0° C., and most preferably to between −25° C. and −35° C. Chilling the compressed feed gas 242 to such low temperatures prior to expansion is advantageous in that more condensation of Carbon Dioxide takes place for the same expansion pressure ratio. In general, care must be taken not to condense the Carbon Dioxide at this stage, as this could be harmful to the expander. If, however, the conditions are chosen to have some condensation of Carbon Dioxide liquid in process gas 247, a suitable vapor liquid separator can advantageously be provided upstream of the expander to protect the expander from liquid impingement.

One method of compressed gas chilling involves tailgas 270. Since tailgas 270 typically has a temperature of between about −35° C. and 55° C. some or most of the tailgas 270 can advantageously be re-circulated through the heat exchanger 245 to assist in cooling the feed gas exiting compressor 240.

In addition, some or most of the recirculation gas stream 272 may be fed back into the process at the compression stage, preferably after purging a fixed quantity to maintain a nearly constant impurity level in the recirculating vapor. Continuous gas monitors may be provided at strategic locations to monitor impurity levels. The purged portion of the gas can then either be vented to the atmosphere or utilized in some other manner, such as purged to a gas turbine, steam generator or fuel gas header, depending on the quantity and quality of the tailgas.

The preferred route taken by the recirculation gas stream 272, and the relative volume of the recirculation gas stream 272 with respect to the tailgas stream 270 is dependent on numerous factors including the quality, quantity, heating value and the Carbon Dioxide content of the gas, type of plants involved, and relative energy and capital costs. In most cases it will be desirable to adjust the parameters to minimize power consumption as and would be apparent to those skilled in the art, although the exact tradeoffs here will likely vary from installation to installation.

It is contemplated that the recirculation gas stream 272 may be supplemented with cooling that employs a refrigerant. The use of such refrigerant does not remove the process from the category of autorefrigeration because a significant portion, such as at least 20%, 30% or 50%, and in preferred embodiments even a major portion such as at least 60%, 80% or 90%, of the cooling effect required to liquefy the Carbon Dioxide is provided by compressing and then expanding the feed gas stream 230 containing the Carbon Dioxide being liquefied. Where a refrigerant is employed, a relatively, environmentally friendly refrigerant such as R-134A is preferred.

Expander 250

Expansion preferably takes place immediately after the compression stage, but alternatively may take place after one or more cooling or chilling steps following compression. It is also preferred that expansion occurs in a single step to minimize the capital cost, but may alternatively involve multiple steps.

Expansion of the process gas 247 is accompanied by extraction of work from the system. This causes a reduction in pressure and temperature of the process gas 247, which in turn condenses some, and preferably nearly all of the Carbon Dioxide present in the process gas 247. Typically the final pressure after the expansion stage is between 7 and 25 bar absolute. The fluid 255 exiting the expansion stage is a two-phase mixture of vapor and liquid, at least a portion of the liquid being Carbon Dioxide. The vapor phase typically contains a relatively small amount of Carbon Dioxide, with the balance being made up of other gases such as hydrogen, nitrogen, carbon monoxide, or methane, depending on the source gas. The liquid phase may also contain such impurities, although in relatively small concentrations due to their much lower boiling points.

Any suitable equipment for expansion may be used, although typically turbine expanders are contemplated.

Separator 260

The separator 260 is contemplated to be any suitable separator, and may be entirely conventional. An exemplary separator is a flash drum. The bottoms stream comprises substantially a substantially pure Carbon Dioxide stream 280, while the top stream 270 comprises the substantially Carbon Dioxide free tailgas.

Optional Liquid Carbon Dioxide Purification 282

Although the Carbon Dioxide stream 280 is contemplated to be substantially pure Carbon Dioxide, the purity may only be in the 98% to 99.5% range. For some applications such purity is perfectly adequate. For other applications, however, additional purification may be needed, and such additional purification is contemplated to be achieved using any suitable means. For purposes of illustration, a generalized purification device 282 is depicted in FIG. 2. Distillation is particularly preferred, and the process may involve any combination of suitable equipment, including a stripping column or reboiler. In a particular embodiment, the details of which are not shown, the Carbon Dioxide stream 280 passes down the stripping column, and is stripped of impurities by vaporized Carbon Dioxide produced in the reboiler passing up the stripping column, according to principles known in the art. The resulting Carbon Dioxide product after purification may be 97% Carbon Dioxide, preferably 98% Carbon Dioxide, and most preferably over 99% Carbon Dioxide. By careful distillation or other means, it is possible to obtain a high purity or food grade product, comprising 99.999% Carbon Dioxide or even more than 99.999% Carbon Dioxide after purification. The purified Carbon Dioxide 284 may then be stored as a liquid under pressure and/or employed for uses 290. The impurities, removed as waste gases from the impurity stripping column, may be released to the atmosphere, if legislation permits, or used as an energy source, as described above, or burnt in a flare.

The heat used in the reboiler may be from any known source, although in the present invention heat for the reboiler may be supplied by warm gas exiting a compressed gas cooling or chilling step, preferably after the final compressed gas cooling step. In this way, energy consumption of the process is reduced.

Uses for Liquid Carbon Dioxide 290

All commercially viable uses 290 are contemplated for the Carbon Dioxide streams 280 and 284. Exemplary uses are for the carbonation of beverages, metal-inert gas (MIG) welding, inert gas blanketing, beer-making and dry cleaning.

Specific Embodiments

Figure 3:
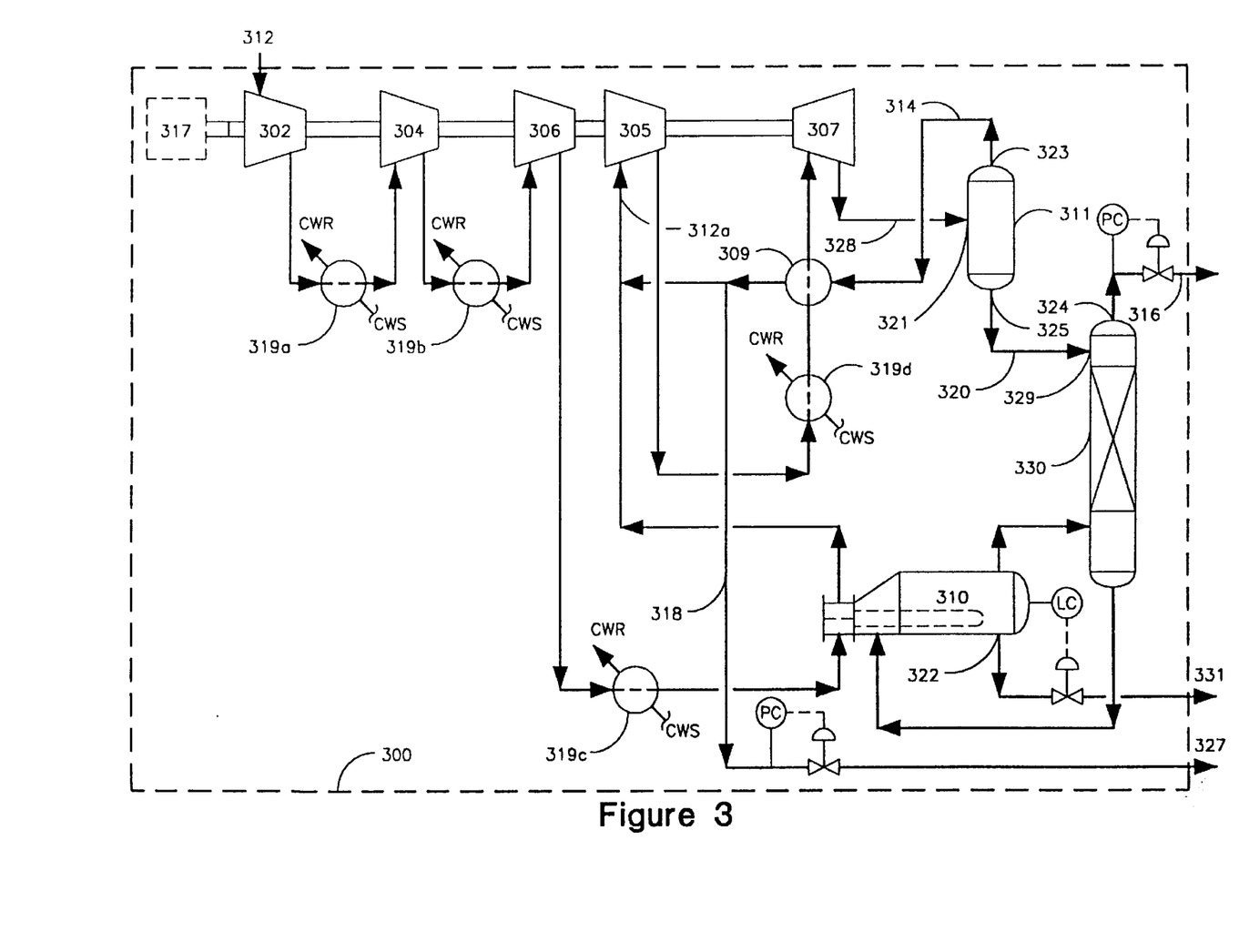
FIG. 3 is a flow diagram of another embodiment according to the present invention.

In FIG. 3, a system 300 is employed to separate Carbon Dioxide from a feed gas 312 comprising Carbon Dioxide. The system 300 comprises a plurality of compressors, expanders and separators arranged in series as shown. The system 300 is driven by a steam turbine or other prime mover 317 attached to the compression system 303 present at the start of the system 300. The compression system 303 comprises three compressors 302, 304 and 306 arranged in series and in flow communication. A further compressor, the gas recirculation compressor 305, is positioned between the compression system 303 and the gas chilling heat exchanger 309, where compression gas chilling takes place, and comprises an inlet for feed gas 312 and recirculating gas 314 produced by separation of the two-phase mixture 328 resulting from expansion.

Between each of the compressors 302, 304, 306 and 305, and between compressor 305 and the gas chilling heat exchanger 309, compressed gas coolers in the form of heat exchangers 319a, 319b, 319c and 319d for compressed gas cooling are provided. Cooling water CWS flows through the compressed gas coolers 319a, 319b, 319c and 319d, and draws heat from the feed gas 312 passing alongside, exiting at CWR.

Feed gas 312 and recirculating gas 314 are mixed, and the mixture is designated as process gas 312a. The compressed gas chilling heat exchanger 309 is positioned upstream of the gas recirculation compressor 305, in order to chill the process gas 312a prior to entry into the expander 307. Cold recirculating gas 314 from the separator 311 flows through gas chilling heat exchanger 309, and draws heat from the process gas 312a. Use of the recirculating gas 314 in the gas chilling heat exchanger allows the temperature of the process gas 312a to be chilled to below ambient temperature. The gas chilling heat exchanger 309 is in communication with the gas recirculation compressor 305, such that recirculating gas 314 may be recycled from the separator 311, via the gas chilling heat exchanger 309, back into the gas recirculation compressor 305. To prevent the build up of impurities in the recirculating gas 314, part of the gas 314 is purged through stream 318 to a gas turbine for power generation.

Upstream of the gas cooling heat exchanger 309 is an expander 307, which preferably leads directly to the vapor/liquid separator 311 via stream 328. The expander 307 decreases the pressure of the feed gas 312 to about 22 bar absolute, resulting in a condition at which Carbon Dioxide condenses, stream 328 comprises a two-phase mixture of vapor containing impurities (recirculating gas) 314, and a liquid containing Carbon Dioxide 320. The mixture is separated in separator 311.

The separator 311 comprises an inlet 321 for the two-phase mixture 328 from the expander 307. An outlet 323 is provided at the top of the separator 311 for the vapor 314, leading to the gas cooling heat exchanger 309, and on to the gas recirculation compressor 305. A second outlet 325 is also provided on the bottom of the separator 311 for liquid containing Carbon Dioxide 320, leading into the impurity stripping column 330.

The impurity stripping column 330 cooperates with a reboiler 310. A first outlet 322 is provided in the reboiler 310 for removal of the liquid Carbon Dioxide to storage, and a second outlet 324 is provided at the top of the stripping column 330 for removal of impurities as vapor stream 316.

The method of use should be readily apparent. A dry feed gas 312 is fed into the system 300 at the first compressor 302 of the compression system 303. If the feed gas is wet a gas dryer (not shown) can be used, and such gas dryer is preferably located between heat exchanger 319c and production of process gas 312a. The feed gas 312 is compressed, and exits the compressor 302. The feed gas 312 passes through a compressed gas cooler 319a, where cooling water reduces the temperature. The process is repeated, with the feed gas 312 entering compressor 304, then compressor 306 and being cooled after each compression by water in coolers 319b and 319c, typically to a temperature of approximately 40° C. On exit from the compression system 303, the feed gas 312 has a pressure of about 22 bar absolute. After compressed gas cooling step 319c, the feed gas 312 is passed through the reboiler 310 where the feed gas 312 is further cooled by cold liquid from the stripping column 330.

The process gas 312a is further compressed in the gas recirculation compressor to a pressure of 45 bar absolute. The process gas 312a exits the gas recirculation compressor 305 to be first cooled in a cooler 319d, and further chilled in the gas chilling heat exchanger 309, where the temperature of process gas 312a is further lowered.

The process gas 312a then enters the expander 307, where expansion occurs to a pressure range between 9 and 22 bar absolute. As work is drawn from the process gas 312a, the temperature lowers to between −25 and −55° C., and condensation of part of the Carbon Dioxide takes place. The majority of other components of 312a remain gaseous at this temperature. The process gas 312a leaves the expander 307 is thereby converted into a two-phase mixture of vapor and liquid.

The two-phase mixture 328 is fed into the separator 311, where the vapor 314 (recirculation gas) relatively high in impurities and relatively low in Carbon Dioxide content, is released from outlet 323 at the top of the separator 311. The outlet 323 leads to the gas chilling heat exchanger 309 where the recirculation vapor 314 is used as a coolant to lower the temperature of the feed gas 312 prior to entry into the expander 307. The majority of vapor 314 exiting the gas chilling heat exchanger 309 may be recycled into the gas recirculation compressor 305, with a part 318 purged from the system and fed to either a gas turbine, a steam generator, fuel gas header or flare 327, depending on its purity and constituents. The amount of vapor 314 fed to either the gas recirculation compressor 305 or the power generator 327 will depend on the Carbon Dioxide content of the gas, the higher the content, the higher the ratio of recycling to the gas recirculation compressor 305.

The liquid Carbon Dioxide 320 of the two-phase mixture 328 is high in Carbon Dioxide content, and may contain some impurities such as hydrogen, nitrogen, methane or carbon monoxide. The liquid Carbon Dioxide 320 is then fed from the outlet 325 at the bottom of the separator 311, and into the impurity stripping column 330 any impurities are removed. The impurity stripping column is typically operated at a pressure of 18 to 22 bar absolute.

The majority of the liquid Carbon Dioxide 320 containing some impurities enters the stripping column 330 at an inlet nozzle 329, and is passed down the column into the reboiler 310 where some part forms a vapor due to the heat input. The heat source is warm gas from the compressed gas cooler 319c. As the liquid 320 is drained over tower packing down (not shown) the stripping column 330, the vapor produced in the reboiler rises up the stripping column 330, stripping out any impurities from the liquid Carbon Dioxide. In this way, the liquid Carbon Dioxide 320 from the separator 311 is purified and withdrawn from the reboiler 310 through outlet 322, and sent to storage 331. The pressure of the stripping column 330 is held relatively at constant pressure in the range of 18 and 22 bar by using a pressure regulator. The vapor stream 316 consisting of impurities and a small amount of Carbon Dioxide, exit the stripping column 330 via outlet 324, to the atmosphere, or are fed to a gas turbine power generator 327 by a shunt (not shown).

Figure 4:
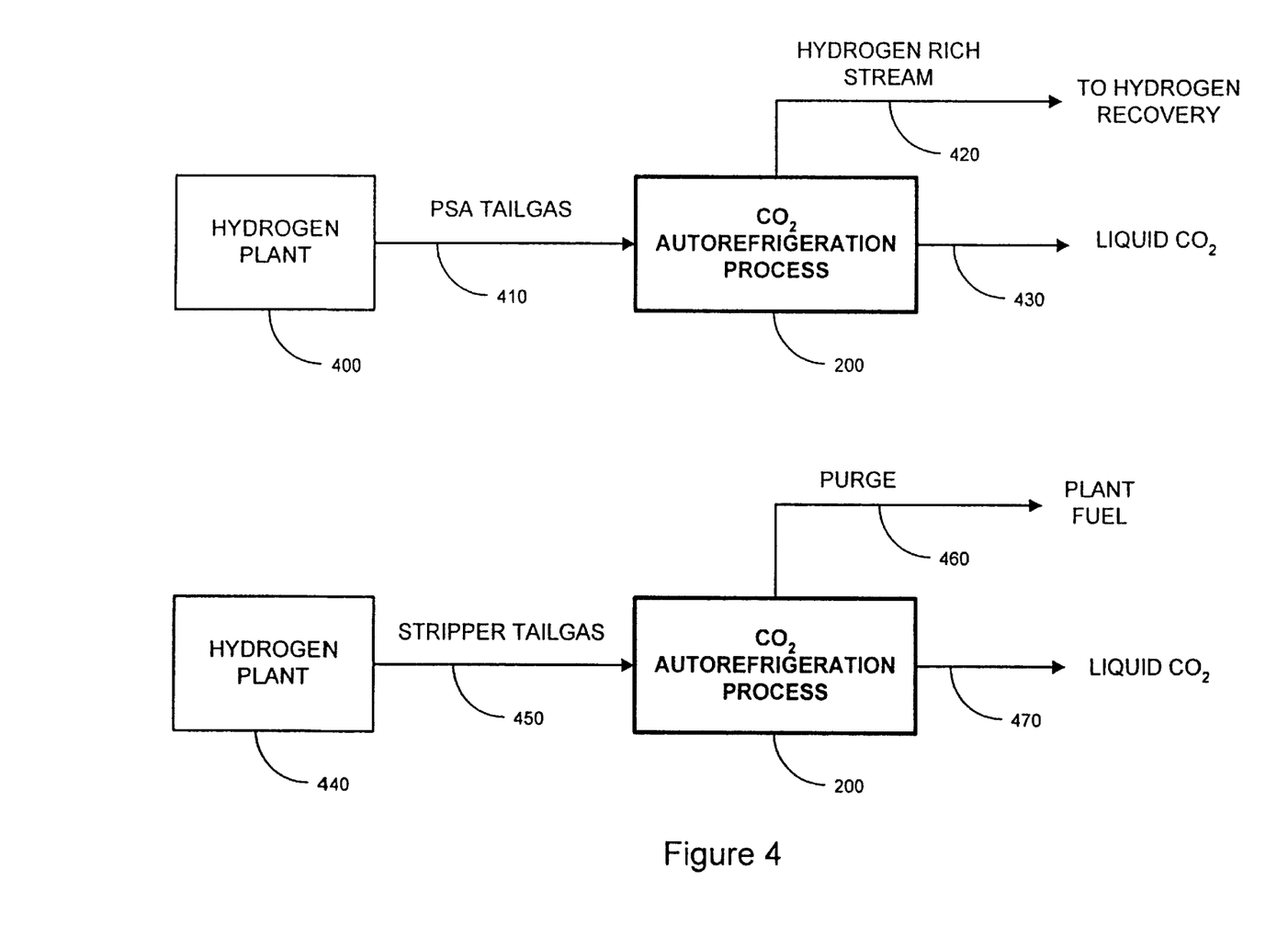
FIG. 4 is a flow diagram of a preferred embodiment in which Carbon Dioxide is recovered from Hydrogen plant tailgases.

FIG. 4 depicts an application of an autorefrigeration process such as autorefrigeration process 200 to the simultaneous recovery of Carbon Dioxide and Hydrogen from tailgas from the Pressure Swing Absorption (PSA) unit of a Hydrogen Plant 400. The PSA unit is used for the purification of Hydrogen. Typically, the PSA tailgas 410 contains mostly Carbon Dioxide and approximately 10% to 30% of Hydrogen. The PSA tailgas is fed to the Carbon Dioxide autorefrigeration process 200 where most of the Carbon Dioxide is recovered as a liquid product 430. A Hydrogen rich stream 420 is produced as a by-product. Stream 420 is either recycled back to the Hydrogen Plant 400 or to a another PSA unit for further Hydrogen recovery.

FIG. 4 also depicts Carbon Dioxide recovery from a solvent based Carbon Dioxide removal system of Hydrogen Plant 440. Instead of having a PSA system for Hydrogen purification, some Hydrogen plants are equipped with solvent based Carbon Dioxide removal systems. These systems produce a stream called the Stripper (or regenerator) tailgas 450 that contains approximately above 90% by volume of Carbon Dioxide. The Carbon Dioxide is produced as a liquid 470 by the autorefrigeration process 200. A purge stream 460 containing small amounts of Carbon Dioxide, Hydrogen, Methane and Carbon Dioxide is co-produced and could be used as a plant fuel.

Figure 5:
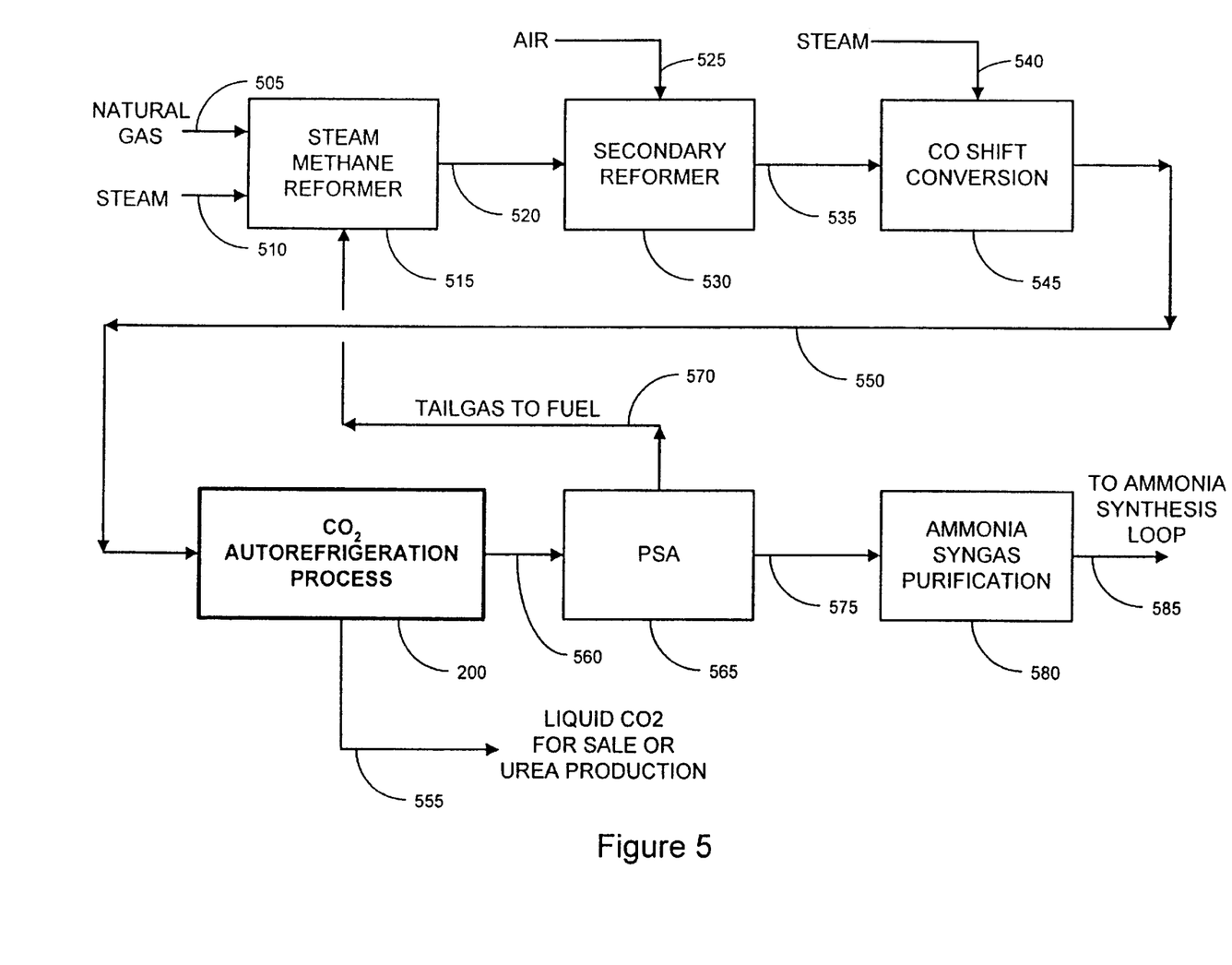
FIG. 5 is a flow diagram of a preferred embodiment in which Carbon Dioxide is recovered from an Ammonia plant syngas.
Figure 6:
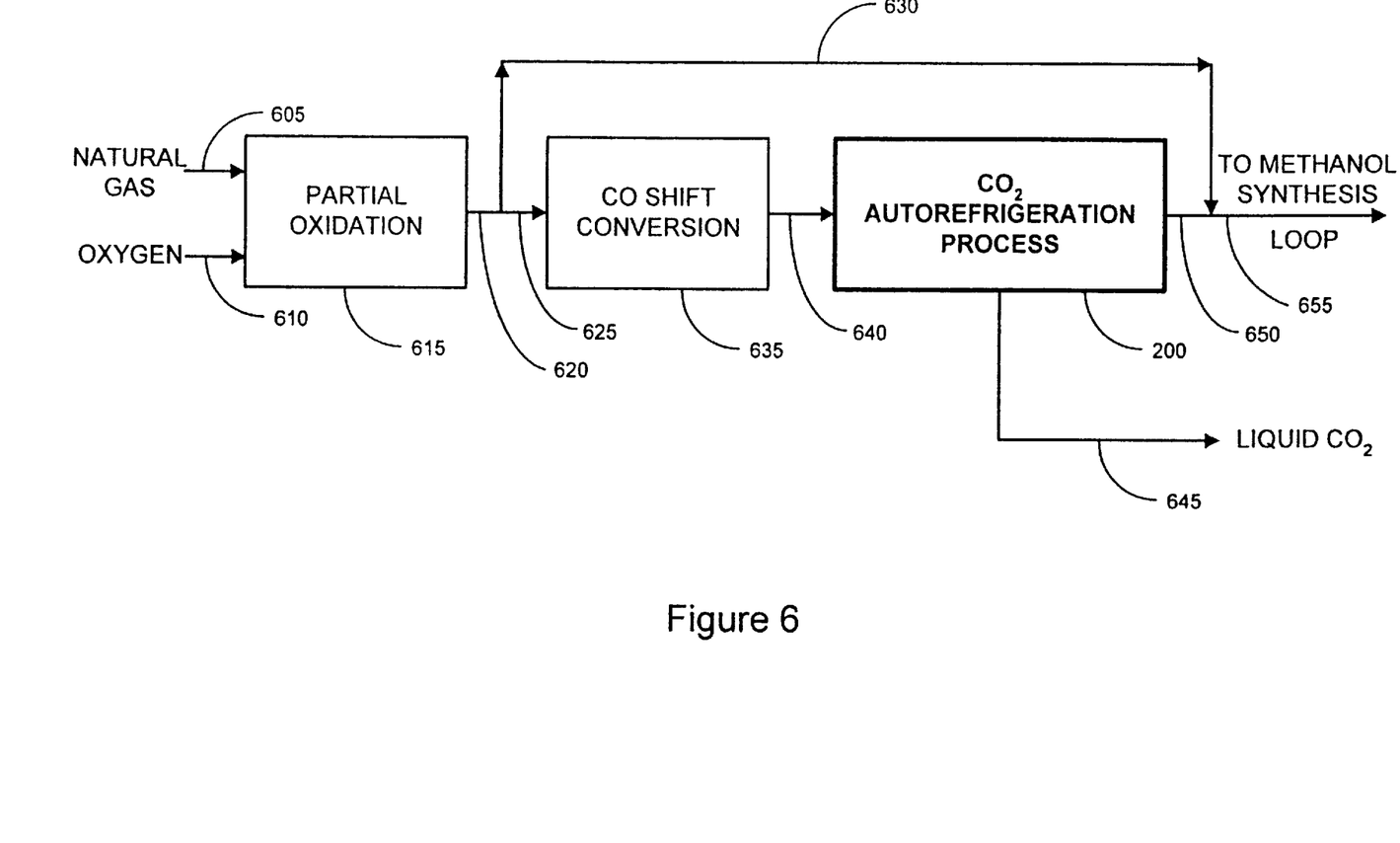
FIG. 6 is a flow diagram of a preferred embodiment in which Carbon Dioxide is recovered from a Methanol plant syngas to adjust the reactor feed gas stoichiometry.

FIG. 5 depicts an application of the autorefrigeration process 200 to the manufacture of Ammonia. Sulfur-free natural gas 505 and steam 510 are fed to steam methane reformer 515. The majority of the methane feed is converted to a synthesis gas (syngas) 520 comprising of Hydrogen and Carbon Monoxide. The syngas 520 is fed to the secondary reformer 530 where most of the remaining methane is converted to syngas in the secondary reformer by the addition of air 525. The syngas 535 exiting 530 is fed to a CO shift conversion system 545, where the carbon Monoxide in 535 is converted by a steam 540 in addition, to produce more Hydrogen and Carbon Dioxide. The bulk Carbon Dioxide in stream 550 is removed by the Autorefrigeration System 200 as a liquid product 555. Stream 555 can be sold as a by-product or used for the manufacture of urea. Syngas 560 is then fed to a PSA unit 565 where a Hydrogen/Nitrogen mixture 575 is produced. Tailgas 570 from the PSA unit is used as fuel in steam methane reformer 515. Stream 575 is fed to an Ammonia Syngas Purification unit 580 where the residual Carbon Dioxide and Carbon Monoxide are converted into Methane that can be tolerated by the Ammonia Synthesis catalyst. Stream 585 from unit 580 is fed to the Ammonia Synthesis Loop where Ammonia is produced.

Carbon Dioxide recovery from Ammonia plants based on Autothermal Reforming or Partial Oxidation technologies can be implemented as described above by using the autorefrigeration process 200.

FIG. 6 depicts an application of an autorefrigeration process such as autorefrigeration process 200 to the manufacture of Methanol. Synthesis gas 620, which is a mixture of Hydrogen, Carbon Monoxide and Carbon Dioxide, is produced by the partial oxidation of natural gas 605 using Oxygen 610 in a partial oxidation reactor (gasifier) 615. For the manufacture of Methanol it is important to adjust the stoichiometry of the syngas such that the following ratio is satisfied:

$$(C_{H2} - C_{Carbon\ Dioxide})/(C_{CO} + C_{Carbon\ Dioxide}) = 2.0$$

Where $C_{H2}$=Concentration of the Hydrogen in stream 655
$C_{CO}$=Concentration of the Carbon Monoxide in stream 655
$C_{Carbon\ Dioxide}$=Concentration of the Carbon Dioxide in stream 655

In order is achieve the above ratio, a calculated portion 625 of the total syngas 620 from unit 615 is fed to the Carbon Monoxide Shift Conversion System 635. The bulk of the Carbon Monoxide in stream 625 is converted to Carbon Dioxide. The syngas 640 from unit 635 is fed to the autorefrigeration process 200 where the Carbon Dioxide is removed as a liquid stream 645. The Carbon Dioxide lean tailgas 650 is mixed with Stream 630 (which by-passed units 635 and 200) and fed as Stream 655 to the Methanol Synthesis Loop where Methanol is produced. Stream 655 meets the stoichiometric ratio discussed above.

Figure 7:
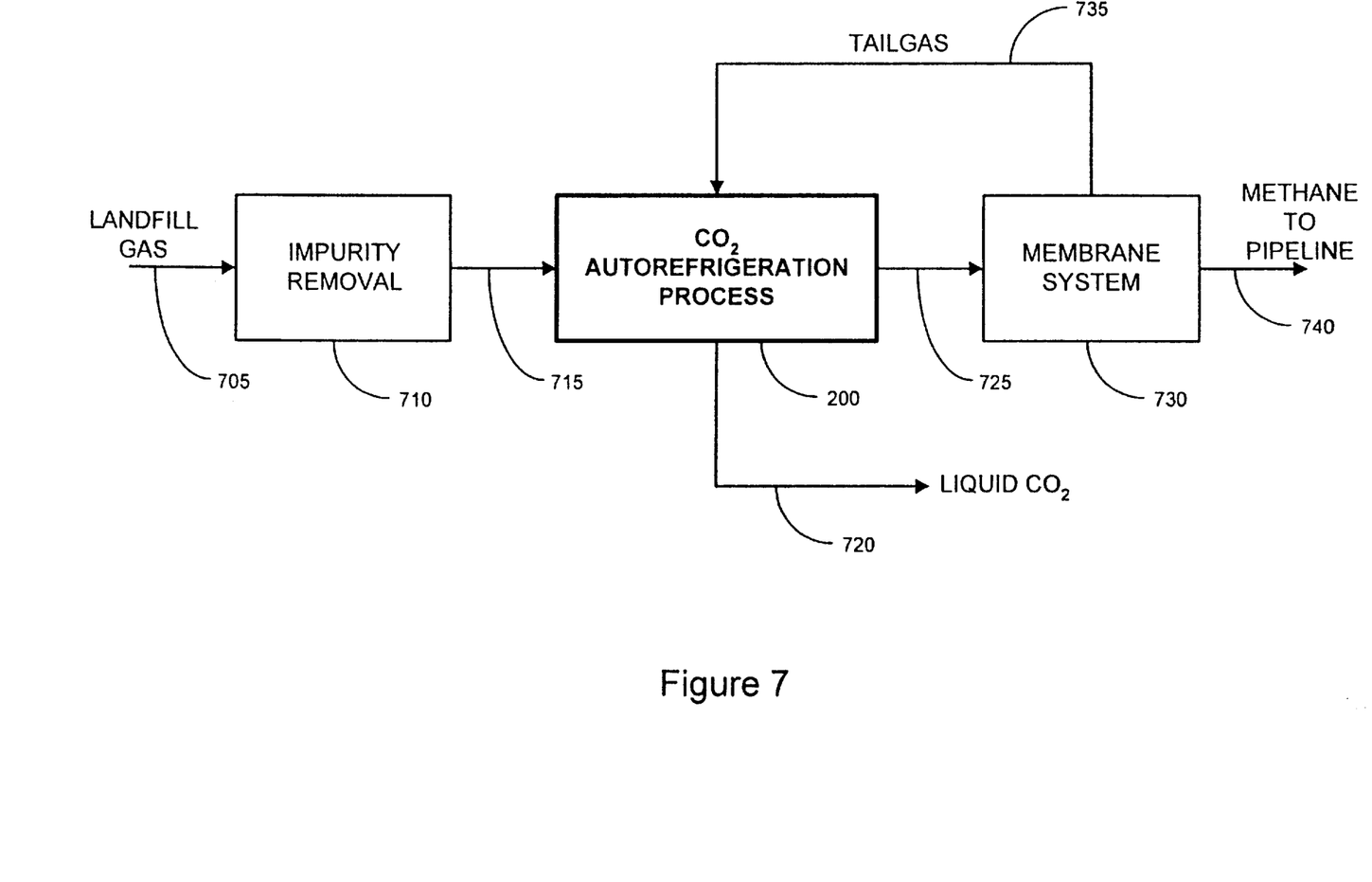
FIG. 7 is a flow diagram of a preferred embodiment in which Carbon Dioxide is recovered as a useful product from landfill gas while producing a pipeline quality methane.

FIG. 7 depicts an application of an autorefrigeration process such as autorefrigeration process 200 to the production of Carbon Dioxide and pipeline specification Methane gas from a Land-fill gas source 705. Here, stream 705 likely contains nearly equal quantities of Methane and Carbon Dioxide. In addition, Stream 705 contains several organic compounds in varying quantities, and traces of air. These impurities are removed in the Impurity Removal unit 710. The gas 715 from unit 710 is fed to the autorefrigeration process 200 where the bulk of the Carbon Dioxide is removed as a liquid product. The tailgas 725 is fed at the required pressure, typically in the range of 30 to 45 bar to a Membrane System 730. Stream 740 from Unit 730 contains the bulk of the Methane in Stream 725 and 1.5 to 3% by volume of Carbon Dioxide as impurity. Tailgas 735 from unit 730 containing Carbon Dioxide and a small part of the Methane in Stream 725 is recycled to Unit 200. Stream 740 containing enriched Methane is fed to a gas pipeline.

Figure 8:
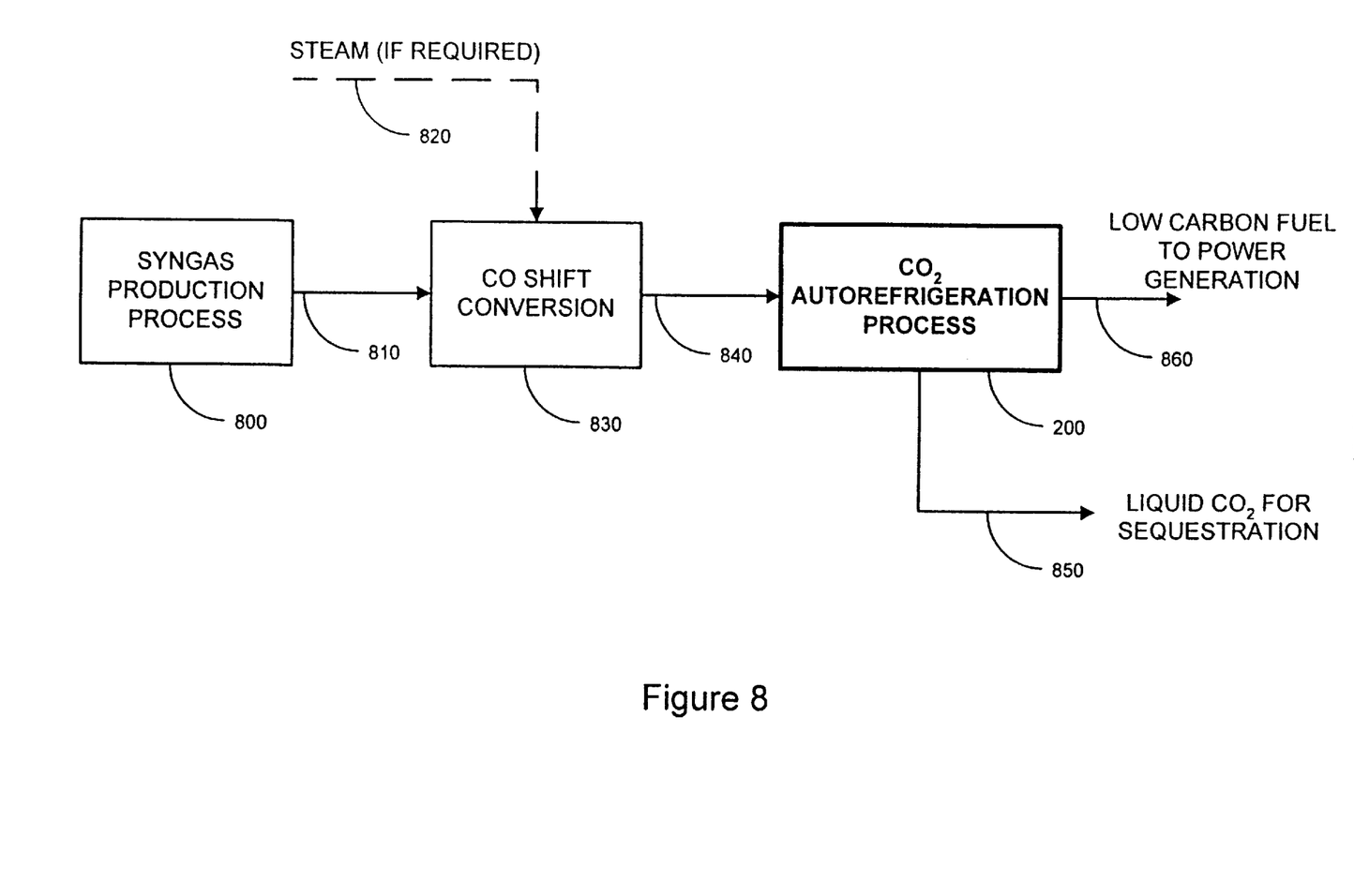
FIG. 8 is a flow diagram of a preferred embodiment in which Carbon is removed from power plant fuels as Carbon Dioxide to achieve a pre-combustion carbon capture to mitigate green-house gas emissions.

FIG. 8 depicts an application of an autorefrigeration process such as autorefrigeration process 200 to the production of low Carbon fuels. In recent years, there is an increased concern about global warming. The sequestration of Carbon Dioxide emissions from power plants is being planned. An approach that is being considered is the capture of carbon prior to the combustion of the fuel. This approach is called Pre-combustion Carbon Capture.

In the pre-combustion carbon capture, a syngas containing Hydrogen and Carbon Monoxide is produced by a Syngas Production Process 800. This process could be based on Stearn-Methane Reforming, or Autothermal Reforming or Partial Oxidation or combinations of these processes. The syngas 810 is fed to a CO Shift Conversion System 830 where most of the Carbon Monoxide is converted to Carbon Dioxide. Stearn 820 is added to Unit 830 if required. The bulk of the Carbon Dioxide in Stream 840 is removed by the autorefrigeration process, such as autorefrigeration process 200, as a liquid stream 850. The tailgas containing a highly reduced Carbon content and almost all of the Hydrogen in Stream 840 is fed to the power generation facility with stream 860. The carbon emission from the power generation facility is consequently greatly reduced.

Figure 9:
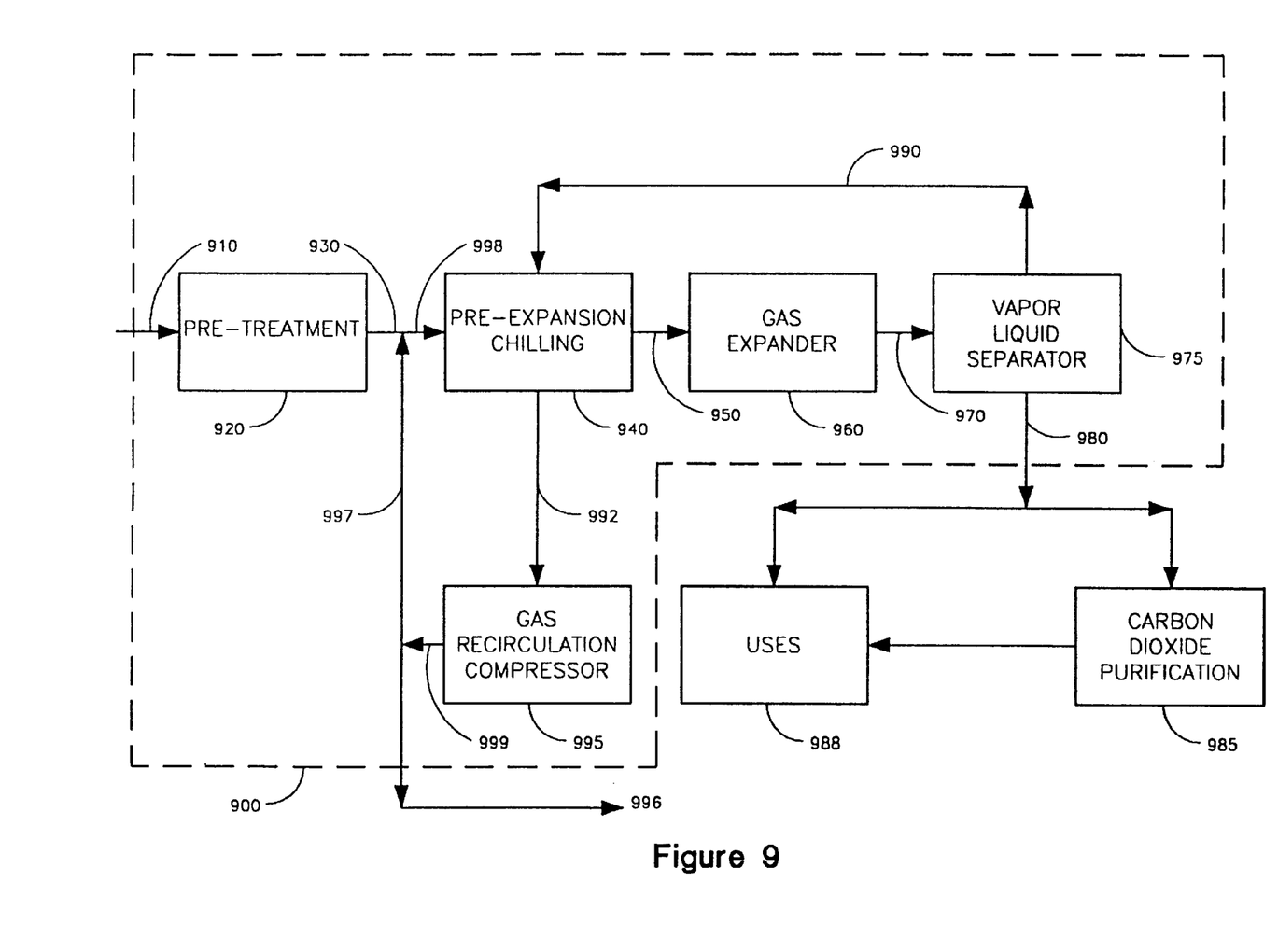
FIG. 9 is a flow diagram of another preferred embodiment, specifically adapted to handle a high pressure feed.

FIG. 9 depicts the basic Carbon Dioxide Autorefrigeration Process 200 modified to handle a high pressure source gas 910. The Carbon Dioxide Autorefrigeration Process configuration to handle a high pressure source gas is designated 900 and is described below.

In configuration 900, the source gas 910 is available at pressures between 30 and 80 bar absolute. Source gas 910 is treated in a pre-treatment unit 920 to remove impurities such as organic and sulfur compounds. If the gas has moisture, it is dried. The treated gas 930 is mixed with recirculating gas 997 to form process gas 998. Process gas 998 is fed to the pre-expansion cooling unit 940, where chilled process gas 950 is produced by heat exchange with cold vapor 990 from the vapor liquid separator 975. The chilled process gas 950 is fed to the gas expander 960. The expansion of gas together with the extraction of work in the gas expander leads to liquid Carbon Dioxide production. The gas expander pressure ratio is selected to achieve the required level of Carbon Dioxide removal. A two-phase mixture 970 of vapor and liquid exits from the gas expander 960 and is fed to a vapor liquid separator 975. The separated Carbon Dioxide liquid 980 from unit 975 is sent directly to uses 988 or to the Carbon Dioxide purification unit 985. Purified Carbon Dioxide from unit 985 is sent to uses 988.

Process gas 990 constituting the vapor from 975 is used for cooling stream 998 in the pre-expansion chilling unit 940. Process gas 992 from unit 940 is fed to the gas recirculation compressor 995 where the gas is compressed to a pressure high enough for mixing with treated gas 930. The compressed process gas 999 from the gas recirculation compressor 995 is split into two streams. The first stream 997 is mixed with the treated gas 930 and fed to the pre-expansion chilling unit as stream 998. The second stream 996 is the tailgas (purge) to control the buildup of the non-Carbon Dioxide constituents of the source gas. Tailgas 996 is typically used as a reactor feed, a syngas, or a power plant fuel. Alternatively, the tailgas 996 is sent to further purification or flared. If a lower pressure can be tolerated by the end use of tailgas 996, then the tailgas can be split off before the gas recirculation compressor 995 to save on compression energy.

Thus, specific embodiments and applications of Carbon Dioxide separation by autorefrigeration have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A method of separating Carbon Dioxide from a feed gas comprising:

directing a feed gas containing Carbon Dioxide to an expansion turbine, expanding the feed gas to liquefy the Carbon Dioxide and produce work, and separating the liquid Carbon Dioxide from the feed gas.

2. The method of claim 1 wherein the Carbon Dioxide concentration comprises at least 40% of the feed gas.

3. The method of claim 1 wherein the Carbon Dioxide concentration comprises at least 60% of the feed gas.

4. The method of claim 1 wherein the Carbon Dioxide concentration comprises at least 80% of the feed gas.

5. The method of claim 1 wherein the feed gas comprises a source gas derived from a landfill.

6. The method of claim 1 wherein the feed gas comprises a source gas derived from a refinery.

7. The method of claim 1 wherein the feed gas comprises a source gas derived from a natural gas.

8. The method of claim 1 further comprising purifying the source gas by including at least one of the following processes:

removing water from the source gas;

filtering particulate matter from the source gas; and removing sulfur derivatives from the source gas.

9. The method of claim 1 further comprising compressing the feed gas to at least 15 bar absolute.

10. The method of claim 9 wherein compressing the feed gas comprises a pressure of at least 30 bar absolute.

11. The method of claim 9 wherein compressing the feed gas comprises a pressure of at least 60 bar absolute.

12. The method of claim 9 wherein the compressing comprises compressing the feed gas using a centrifugal compressor.

13. The method of claim 1 wherein expanding comprises expanding the feed gas using a centrifugal expander.

14. The method of claim 1 wherein the liquid Carbon Dioxide is purified to at least 99% purity.

15. The method of claim 1 wherein compressing the feed gas and expanding the compressed feed gas accounts for at least about 30% of the cooling employed in liquefying the Carbon Dioxide.

16. The method of claim 1 wherein compressing the feed gas and expanding the compressed feed gas accounts for at least about 60% of the cooling employed in liquefying the Carbon Dioxide.

17. The method of claim 1 wherein the Carbon Dioxide comprises at least 40% of the feed gas, and wherein the feed gas further comprises a source gas derived from at least one of natural gas, syn gas, and landfill gas, and wherein compressing the feed gas and expanding the compressed feed gas accounts for at least about 30% of the cooling employed in liquefying the Carbon Dioxide.

18. The method of claim 1 wherein the Carbon Dioxide comprises at least 40% of the feed gas, and wherein the feed gas further comprises compressing the feed gas to at least 15 bar absolute, and wherein compressing the feed gas and expanding the compressed feed gas accounts for at least about 30% of the cooling employed in liquefying the Carbon Dioxide.

19. The method of claim 1 wherein the feed gas comprises compressing the feed gas to at least 15 bar absolute and wherein the liquid Carbon Dioxide is purified to at least 99% purity, and wherein compressing the feed gas and expanding the compressed feed gas accounts for at least about 30% of the cooling employed in the liquefying the Carbon Dioxide.

20. The method of claim 1 wherein the work comprises driving a compressor.

* * * * *